(12) United States Patent
Tu et al.

(10) Patent No.: US 7,259,959 B2
(45) Date of Patent: Aug. 21, 2007

(54) COMPUTER HOUSING

(75) Inventors: Cheng Tu, Taipei Hsien (TW); Pen-Hu Lan, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 219 days.

(21) Appl. No.: 11/109,937

(22) Filed: Apr. 20, 2005

(65) Prior Publication Data

US 2006/0018091 A1    Jan. 26, 2006

(30) Foreign Application Priority Data

Jul. 22, 2004    (TW) .............................. 93121864 A

(51) Int. Cl.
  *G06F 1/16*    (2006.01)
(52) U.S. Cl. .................... 361/685; 248/694; 312/223.2
(58) Field of Classification Search ................ 361/685; 312/223.2; 248/694
    See application file for complete search history.

(56) References Cited

U.S. PATENT DOCUMENTS 6,305,660 B1 *  10/2001  Liao ............................ 248/694
6,728,109 B1 *   4/2004  Wu ............................. 361/685
6,917,520 B2 *   7/2005  Lin et al. ..................... 361/685
6,935,604 B2 *   8/2005  Chen ........................... 248/694
7,038,907 B2 *   5/2006  Chen ........................... 361/685
7,137,767 B2 *  11/2006  Franke et al. ................ 361/685
2003/0169565 A1 *  9/2003  Wang ........................... 361/685

FOREIGN PATENT DOCUMENTS

CN    ZL 002650443.4    11/2000
CN    ZL 02250747.7     12/2002

* cited by examiner

*Primary Examiner*—Lisa Lea-Edmonds
(74) *Attorney, Agent, or Firm*—Foley & Lardner LLP

(57) ABSTRACT

A fastening mechanism includes a mounting seat mounted on a frame body, disposed at a mounting hole in a frame body, and configured with an accommodating space therein. The mounting seat has a mounting wall formed with an opening for access into the accommodating space, and an outer surrounding wall connected to a periphery of the mounting wall. An engaging member extends movably in the accommodating space in the mounting seat, and is operable so as to move from a releasing position, where the engaging member disengages a fastening hole in a peripheral device, to an anchoring position, where the engaging member engages the fastening hole in the peripheral device such that the peripheral device is fastened to the frame body. The engaging member can be retained releasably in a selected one of the anchoring and releasing positions.

18 Claims, 3 Drawing Sheets

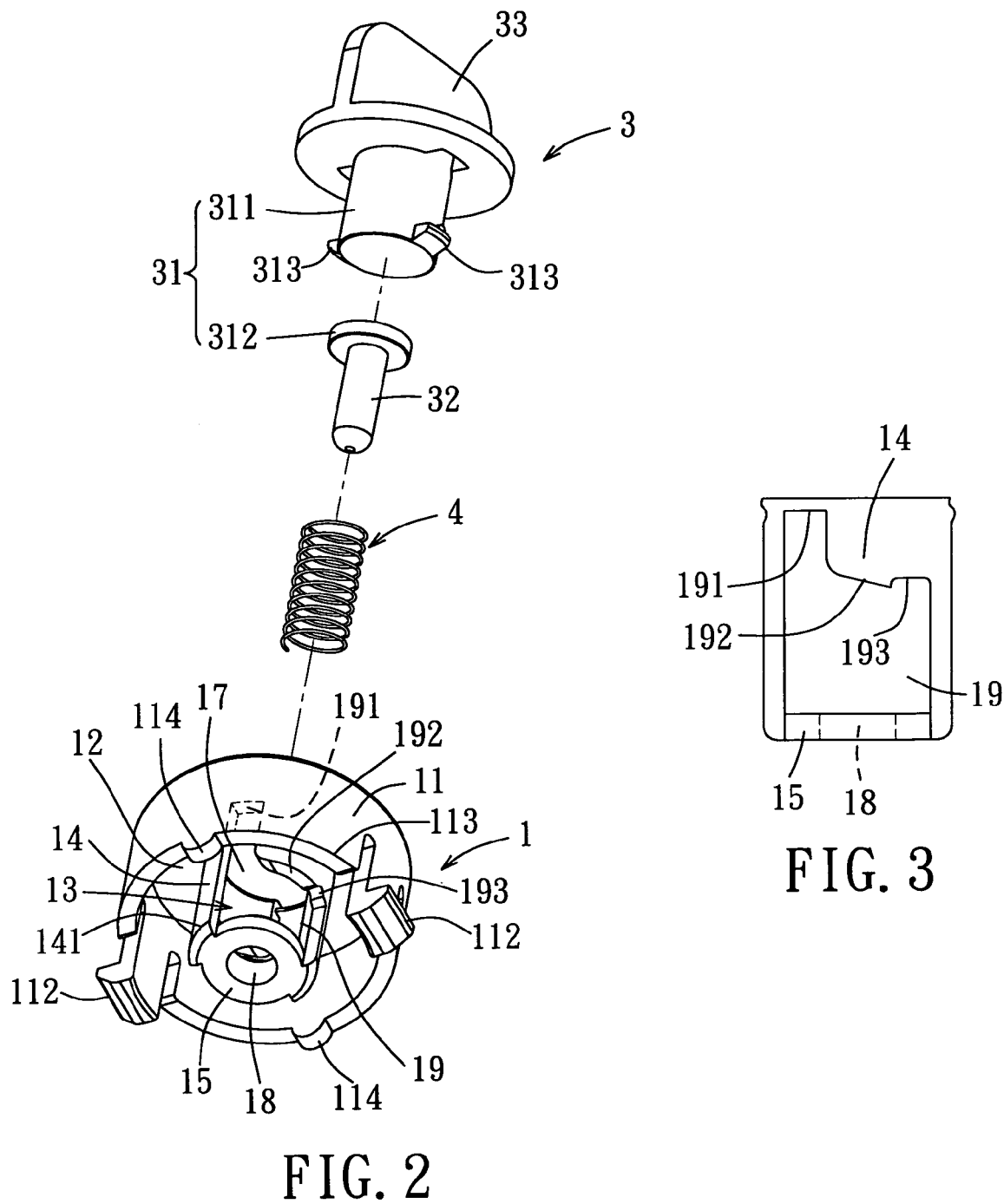

COMPUTER HOUSING

CROSS-REFERENCE TO RELATED APPLICATION

This application claims priority of Taiwanese Application No. 093121864, filed on Jul. 22, 2004.

BACKGROUND OF THE INVENTION

1. Field of the Invention

The invention relates to a computer housing, more particularly to a computer housing capable of fastening a peripheral device thereto without the need for tools.

2. Description of the Related Art

Assembly of a peripheral device, such as a floppy disk drive, a hard disk drive or an optical disk drive, to a conventional computer housing can be achieved by means of screw fasteners, each of which extends through a through hole in the conventional computer housing and engages threadedly a screw hole in the peripheral device.

Due to the use of the screw fasteners, tools for tightening and loosening the same, such as various types of screwdrivers, are required during assembly and detachment, thereby arising in inconvenience during use.

SUMMARY OF THE INVENTION

Therefore, the object of the present invention is to provide a computer housing that is capable of fastening a peripheral device thereto without the need for tools.

According to one aspect of the present invention, there is provided a computer housing adapted for fastening a peripheral device thereto. The peripheral device is formed with a fastening hole. The computer housing comprises:

a frame body formed with a mounting hole that corresponds to the fastening hole in the peripheral device;

a mounting seat mounted on the frame body, disposed at the mounting hole in the frame body, and configured with an accommodating space therein, the mounting seat having a mounting wall formed with an opening for access into the accommodating space, and an outer surrounding wall connected to a periphery of the mounting wall;

an engaging member extending movably in the accommodating space in the mounting seat and operable so as to move from a releasing position, where the engaging member is adapted to disengage the fastening hole in the peripheral device, to an anchoring position, where the engaging member is adapted to engage the fastening hole in the peripheral device such that the peripheral device is fastened to the frame body; and stop means provided on the engaging member and the mounting seat for retaining releasably the engaging member in a selected one of the anchoring and releasing positions.

According to another aspect of the present invention, there is provided a fastening mechanism for fastening a peripheral device to a frame body. The peripheral device is formed with a fastening hole. The frame body is formed with a mounting hole corresponding to the fastening hole in the peripheral device. The fastening mechanism comprises:

a mounting seat adapted to be mounted on the frame body, adapted to be disposed at the mounting hole in the frame body, and configured with an accommodating space therein, the mounting seat having a mounting wall formed with an opening for access into the accommodating space, and an outer surrounding wall connected to a periphery of the mounting wall;

an engaging member extending movably in the accommodating space in the mounting seat and operable so as to move from a releasing position, where the engaging member is adapted to disengage the fastening hole in the peripheral device, to an anchoring position, where the engaging member is adapted to engage the fastening hole in the peripheral device such that the peripheral device is fastened to the frame body; and stop means provided on the engaging member and the mounting seat for retaining releasably the engaging member in a selected one of the anchoring and releasing positions.

BRIEF DESCRIPTION OF THE DRAWINGS

Other features and advantages of the present invention will become apparent in the following detailed description of the preferred embodiment with reference to the accompanying drawings, of which:

FIG. 2 is an exploded perspective view showing a mounting seat, an engaging member and a biasing member of the preferred embodiment;

FIG. 3 is a fragmentary schematic view showing the mounting seat of the preferred embodiment;

DETAILED DESCRIPTION OF THE PREFERRED EMBODIMENT

Figure 1:
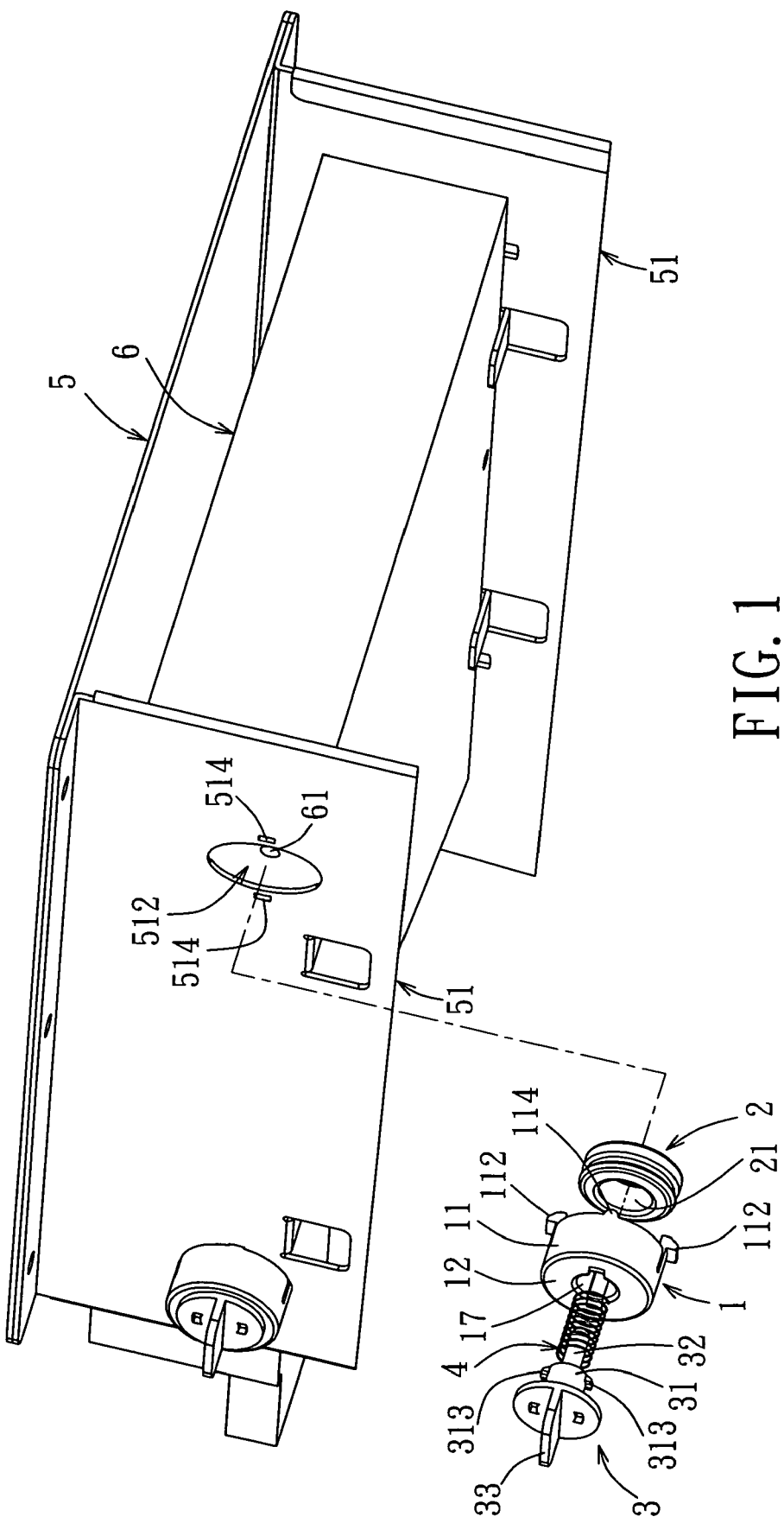
FIG. 1 is an exploded perspective view showing the preferred embodiment of a computer housing according to this invention.

Referring to FIG. 1, the preferred embodiment of a computer housing according to the present invention is shown to be adapted for fastening a peripheral device 6, such as an optical disk drive, thereto. The peripheral device 6 has opposite lateral sides, each of which is formed with a plurality of fastening holes 61. The computer housing includes a frame body 5, a plurality of mounting seats 1, a plurality of engaging members 3, and stop means.

In this embodiment, the frame body 5 includes opposite supporting walls 51 confining a receiving space therebetween for receiving the peripheral device 6. Each supporting wall 51 corresponds to a respective one of the lateral sides of the peripheral device 6. For each fastening hole 61 in the peripheral device 6, the corresponding supporting wall 51 is formed with a mounting hole 512 that corresponds to the fastening hole 61 in the peripheral device 6. In this embodiment, the corresponding supporting wall 51 is further formed with opposite positioning holes 514 disposed adjacent to the mounting hole 512, as shown in FIG. 1.

Figure 5:
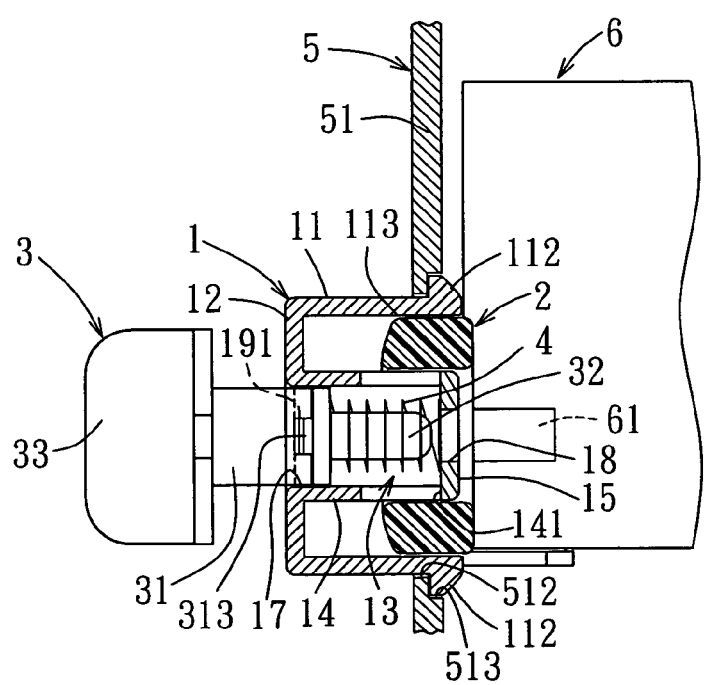
FIG. 5 is a fragmentary schematic sectional view showing the preferred embodiment when the engaging member is in a releasing position.

Each of the mounting seats 1 is mounted on the frame body 5, and is disposed at a respective mounting hole 512 in the frame body 5. In this embodiment, referring further to FIGS. 2 and 5, each mounting seat 1 has a mounting wall 12 formed with an opening 17, an outer surrounding wall 11 connected to a periphery of the mounting wall 12, an inner surrounding wall 14 that extends from a periphery of the opening 17 toward a corresponding one of the supporting walls 51 of the frame body 5 and that has one end 141 distal to the mounting wall 12, and a connecting wall 15 connected to the end 141 of the inner surrounding wall 14 and cooperating with the inner surrounding wall 14 so as to confine an accommodating space 13. As such, the opening 17 in the mounting seat 1 permits access into the accommodating space 13. In this embodiment, the outer surrounding wall 11 of each mounting seat 1 has a free end 113 distal to the mounting wall 12 and formed with opposite engaging hooks 112, each of which extends from the free end 113 and into the respective mounting hole 512 in the frame body 5 and extends radially and outwardly of the outer surrounding wall 11 such that the engaging hooks 112 engage respectively opposite notches 513 in a periphery of the respective mounting hole 512 in the frame body 5, as shown in FIG. 5. Furthermore, the connecting wall 15 of each mounting seat 1 is formed with a through hole 18. The free end 113 of the outer surrounding wall 11 of each mounting seat 1 is formed with opposite positioning projections 114 that engage the positioning holes 514 disposed adjacent to the respective mounting hole 512 in the frame body 5, respectively, thereby positioning the mounting seat 1 on the frame body 5.

Figure 4:
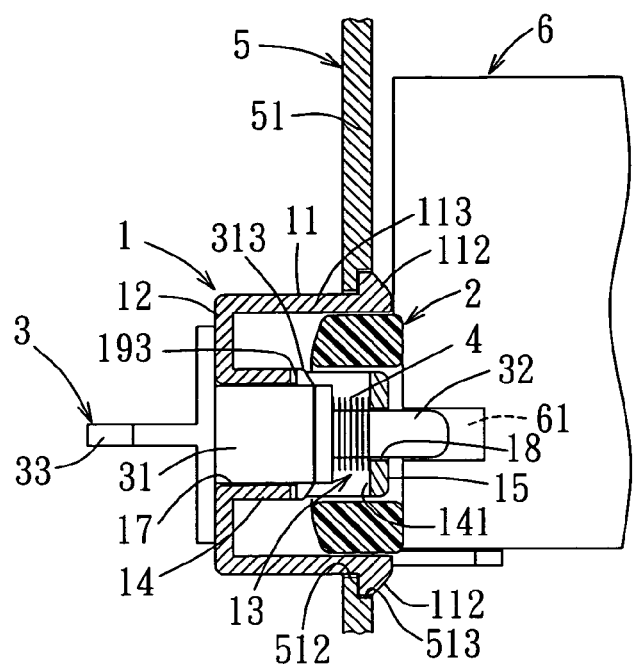
FIG. 4 is a fragmentary schematic sectional view showing the preferred embodiment when the engaging member is in an anchoring position.

Each engaging member 3 extends movably in the accommodating space 13 in a respective mounting seat 1, and is operable so as to move from a releasing position, where the engaging member 3 is adapted to disengage a corresponding fastening hole 61 in the peripheral device 6, as shown in FIG. 5, to an anchoring position, where the engaging member 3 is adapted to engage the corresponding fastening hole 61 in the peripheral device 6, as shown in FIG. 4, such that the peripheral device 6 is fastened to the frame body 5. In this embodiment, each engaging member 3 has an operating end portion 33 disposed outwardly of the accommodating space 13 in the respective mounting seat 1, an engaging end portion 32 opposite to the operating end portion 33, disposed in the accommodating space 13 in the respective mounting seat 1, and extending through the through hole 18 in the connecting wall 15 of the respective mounting seat 1 and into the corresponding fastening hole 61 in the peripheral device 6 when the engaging member 3 is in the anchoring position, and an interconnecting portion 31 interconnecting the operating end portion 33 and the engaging end portion 32 and extending through the opening 17 in the mounting wall 12 of the respective mounting seat 1 (see FIG. 5). In this embodiment, the interconnecting portion 31 of each engaging member 3 has a first section 311 that is connected to the operating end portion 33, and a second section 312 that is connected to the engaging end portion 32, as shown in FIG. 2. Alternatively, the operating end portion 33, the interconnecting portion 31 and the engaging end portion 32 may be formed integrally.

The stop means including a plurality of stop units, each of which is provided on a respective set of the engaging member 3 and the mounting seat 1 for retaining releasably the engaging member 3 in the respective set in a selected one of the anchoring and releasing positions. In this embodiment, as shown in FIG. 2, each stop unit includes opposite engaging lugs 313 provided on the interconnecting portion 31 of the engaging member 3 in the respective set, and opposite L-shaped engaging grooves 19 (only one is shown) that are formed in the inner surrounding wall 14 of the mounting seat 1 in the respective set and that engage movably the engaging lugs 313, respectively. In this embodiment, referring to FIGS. 2 and 3, each engaging groove 19 has a first stop end portion 191 disposed adjacent to the mounting wall 12 and engaging a respective engaging lug 313 when the engaging member 3 is in the releasing position (see FIG. 5), a second stop end portion 193 opposite to the first stop end portion 191, disposed adjacent to the connecting wall 15 and engaging the respective engaging lug 313 when the engaging member 3 is in the anchoring position (see FIG. 4), and an interconnecting guiding portion 192 connected to the first and second stop end portions 191, 193 for guiding movement of the respective engaging lug 313 between the first and second stop end portions 191, 193.

A biasing member 4, which is a compression spring in this embodiment, is mounted in the accommodating space 13 in each mounting seat 1, and is disposed between the interconnecting portion 31 of the respective engaging member 3 and the connecting wall 15 of the respective mounting seat 1 for biasing the engaging member 3 to the releasing position.

A cushion member 2 is mounted between the outer and inner surrounding walls 11, 14 of each mounting seat 1, and is adapted to abut against the peripheral device 6, as shown in FIGS. 4 and 5. In this embodiment, the cushion member 2 is a rubber ring sleeved on the inner surrounding wall 14 and retained between the inner and outer surrounding walls 14, 11, thereby reinforcing engagement between the engaging hooks 112 on the mounting seat 1 and the mounting holes 512 in the frame body 5.

To sum up, by manually operating each engaging member 3, the computer housing of this invention can enable fastening of the peripheral device 6 thereto without the need for tools, thereby resulting in convenience during assembly and detachment.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A computer housing adapted for fastening a peripheral device thereto, the peripheral device being formed with a fastening hole, said computer housing comprising:
   a frame body formed with a mounting hole that corresponds to the fastening hole in the peripheral device;
   a mounting seat mounted on said frame body, disposed at said mounting hole in said frame body, and configured with an accommodating space therein, said mounting seat having a mounting wall formed with an opening for access into said accommodating space, and an outer surrounding wall connected to a periphery of said mounting wall;
   an engaging member extending movably in said accommodating space in said mounting seat and operable so as to move from a releasing position, where said engaging member is adapted to disengage the fastening hole in the peripheral device, to an anchoring position, where said engaging member is adapted to engage the fastening hole in the peripheral device such that the peripheral device is fastened to said frame body; and
   stop means provided on said engaging member and said mounting seat for retaining releasably said engaging member in a selected one of the anchoring and releasing positions.

2. The computer housing as claimed in claim 1, wherein said outer surrounding wall of said mounting seat has a free end distal to said mounting wall and formed with opposite engaging hooks, each of which extends from said free end and into said mounting hole in said frame body and extends radially and outwardly of said outer surrounding wall such that said engaging hooks engage a periphery of said mounting hole in said frame body, thereby mounting said mounting seat on said frame body.

3. The computer housing as claimed in claim 1, wherein said mounting seat further has an inner surrounding wall that extends from a periphery of said opening toward said frame body and that has one end distal to said mounting wall, and a connecting wall connected to said end of said inner surrounding wall and cooperating with said inner surrounding wall so as to confine said accommodating space, said connecting wall being formed with a through hole that permits extension of said engaging member therethrough.

4. The computer housing as claimed in claim 3, wherein said engaging member has an operating end portion disposed outwardly of said accommodating space in said mounting seat, an engaging end portion opposite to said operating end portion, disposed in said accommodating space in said mounting seat, and extending through said through hole in said connecting wall and into the fastening hole in the peripheral device when said engaging member is in the anchoring position, and an interconnecting portion interconnecting said operating end portion and said engaging end portion and extending through said opening in said mounting wall.

5. The computer housing as claimed in claim 4, wherein said stop means includes an engaging lug provided on said interconnecting portion of said engaging member, and an L-shaped engaging groove formed in said inner surrounding wall and engaging movably said engaging lug, said engaging groove having a first stop end portion disposed adjacent to said mounting wall and engaging said engaging lug when said engaging member is in the releasing position, a second stop end portion opposite to said first stop end portion, disposed adjacent to said connecting wall and engaging said engaging lug when said engaging member is in the anchoring position, and an interconnecting guiding portion connected to said first and second stop portions for guiding movement of said engaging lug between said first and second stop end portions.

6. The computer housing as claimed in claim 4, further comprising a biasing member mounted in said accommodating space and disposed between said interconnecting portion of said engaging member and said connecting wall of said mounting seat for biasing said engaging member to the releasing position.

7. The computer housing as claimed in claim 4, further comprising a cushion member mounted between said outer and inner surrounding walls of said mounting seat and adapted to abut against the peripheral device.

8. The computer housing as claimed in claim 7, wherein said cushion member is a rubber ring sleeved on said inner surrounding wall and retained between said inner and outer surrounding walls.

9. The computer housing as claimed in claim 2, wherein said frame body is formed with a positioning hole disposed adjacent to said mounting hole, said free end of said outer surrounding wall of said mounting seat being formed with a positioning projection that engages said positioning hole.

10. A fastening mechanism for fastening a peripheral device to a frame body, the peripheral device being formed with a fastening hole, the frame body being formed with a mounting hole corresponding to the fastening hole in the peripheral device, said fastening mechanism comprising:
a mounting seat adapted to be mounted on the frame body, adapted to be disposed at the mounting hole in the frame body, and configured with an accommodating space therein, said mounting seat having a mounting wall formed with an opening for access into said accommodating space, and an outer surrounding wall connected to a periphery of said mounting wall;
an engaging member extending movably in said accommodating space in said mounting seat and operable so as to move from a releasing position, where said engaging member is adapted to disengage the fastening hole in the peripheral device, to an anchoring position, where said engaging member is adapted to engage the fastening hole in the peripheral device such that the peripheral device is fastened to the frame body; and
stop means provided on said engaging member and said mounting seat for retaining releasably said engaging member in a selected one of the anchoring and releasing positions.

11. The fastening mechanism as claimed in claim 10, wherein said outer surrounding wall of said mounting seat has a free end distal to said mounting wall and formed with opposite engaging hooks, each of which extends from said free end and into the mounting hole in the frame body, and extends radially and outwardly of said outer surrounding wall such that said engaging hooks are adapted to engage a periphery of the mounting hole in the frame body.

12. The fastening mechanism as claimed in claim 10, wherein said mounting seat further has an inner surrounding wall that extends from a periphery of said opening toward the frame body and that has one end distal to said mounting wall, and a connecting wall connected to said end of said inner surrounding wall and cooperating with said inner surrounding wall so as to confine said accommodating space, said connecting wall being formed with a through hole that permits extension of said engaging member therethrough.

13. The fastening mechanism as claimed in claim 12, wherein said engaging member has an operating end portion disposed outwardly of said accommodating space in said mounting seat, an engaging end portion opposite to said operating end portion, disposed in said accommodating space in said mounting seat, and extending through said through hole in said connecting wall and into the fastening hole in the peripheral device when said engaging member is in the anchoring position, and an interconnecting portion interconnecting said operating end portion and said engaging end portion and extending through said opening in said mounting wall.

14. The fastening mechanism as claimed in claim 13, wherein said stop means includes an engaging lug provided on said interconnecting portion of said engaging member, and an L-shaped engaging groove formed in said inner surrounding wall and engaging movably said engaging lug, said engaging groove having a first stop end portion disposed adjacent to said mounting wall and engaging said engaging lug when said engaging member is in the releasing position, a second stop end portion opposite to said first stop end portion, disposed adjacent to said connecting wall and engaging said engaging lug when said engaging member is in the anchoring position, and an interconnecting guiding portion connected to said first and second stop portions for guiding movement of said engaging lug between said first and second stop end portions.

15. The fastening mechanism as claimed in claim 13, further comprising a biasing member mounted in said accommodating space and disposed between said interconnecting portion of said engaging member and said connecting wall of said mounting seat for biasing said engaging member to the releasing position.

16. The computer housing as claimed in claim 13, further comprising a cushion member mounted between said outer and inner surrounding walls of said mounting seat and adapted to abut against the peripheral device.

17. The fastening mechanism as claimed in claim 16, wherein said cushion member is a rubber ring sleeved on said inner surrounding wall and retained between said inner and outer surrounding walls.

18. The fastening mechanism as claimed in claim 11, the frame body being formed with a positioning hole disposed adjacent to the mounting hole, wherein said free end of said outer surrounding wall of said mounting seat is formed with a positioning projection that is adapted to engage the positioning hole in the frame body.

* * * * *